C. P. Eager,

Horse Cover.

No. 3,936. Reissued Apr. 26. 1870.

Witnesses:

Wm. F. Clark alex F. Roberts

Inventor:

C. P. Eager

PER

Attorneys.

N. PETERS, PHOTO-LITHOGRAPHER, WASHINGTON, D. C.

United States Patent Office.

PENUEL B. EAGER, OF BOSTON, MASSACHUSETTS, ASSIGNEE OF CHARLES P. EAGER.

*Letters Patent No.* 97,896, *dated December* 14, 1869; *reissue No.* 3,936 *dated April* 26, 1870.

IMPROVED VENTILATED HORSE-COVER.

The Schedule referred to in these Letters Patent and making part of the same.

Be it known that I, CHARLES P. EAGER, of Boston, in the State of Massachusetts, have invented a new and improved Ventilating Horse-Cover, of which the following, with the accompanying drawings, is a description.

Figure 1:
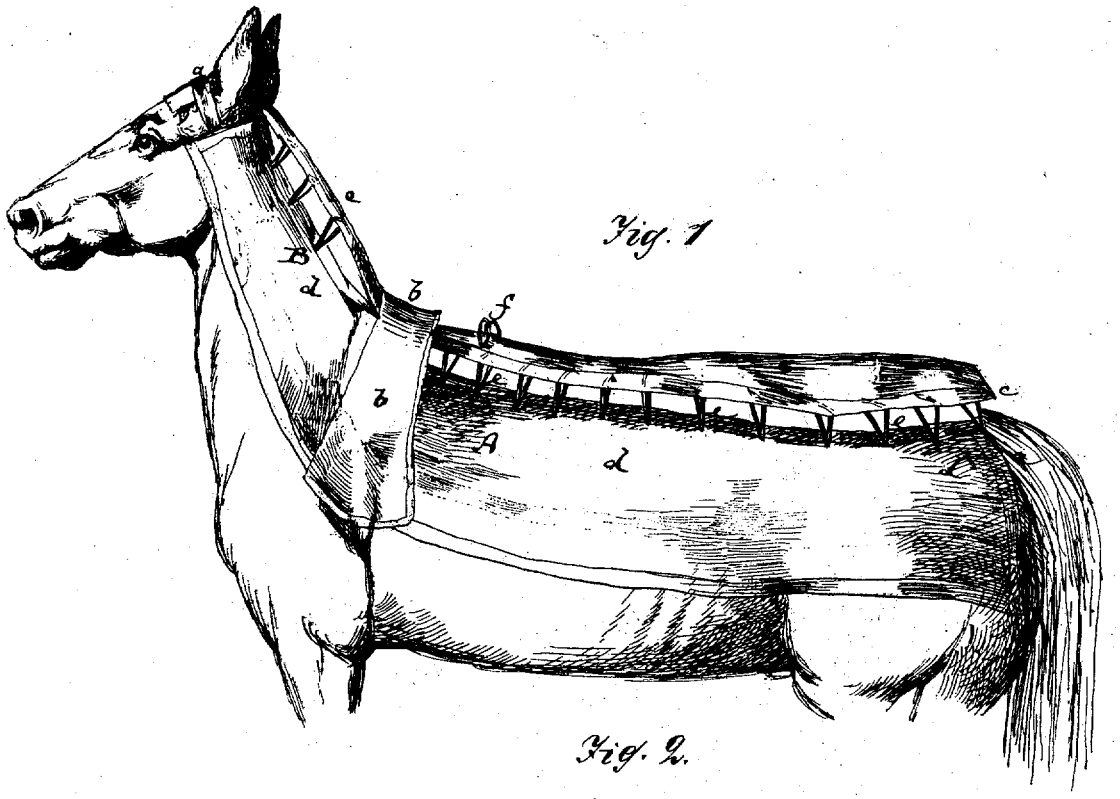
Figure 1 is a side view.
Figure 2:
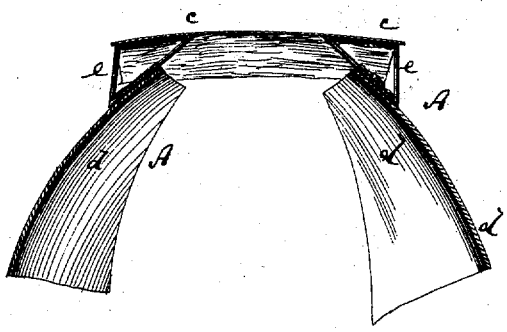
Figure 2 is a vertical transverse section.

My invention consists mainly in so constructing the covering as that a raised central longitudinal portion shall allow of a free ventilation under it and between it and the back of the horse.

I also use elastic straps for fastening the cover to the horse and the parts to each other, and I apply rings or staples for the reins directly to the cover.

A represents that part of the cover which extends from the back down the sides of the horse.

B, the part covering the side of the neck.

*b* represents a flap covering the joint between the side and neck-cover.

The top edges of the side-covers do not come together, but are left some distance apart. They may be held together by straps, if desired.

*c c* is a central piece, extending along the back, somewhat wider than the distance between the top edges of the side-covers, and overlapping them.

This central-cover is elevated above the side-covers above the back of the horse, by means of metallic or other braces, *e e*, arranged at suitable distances apart, and attached to the side and top-covers. In this way the top-cover forms a roof raised above the back of the horse, projecting over the side-covers, and open at the sides for ventilation.

*a a* are elastic straps providing for the close fitting of the covers, and at the same time allow free movements of the horse.

*f* are rings or staples attached to the top-cover for the reins. This cover may be used for the body of the horse, or the neck, or both, as may be desired.

What I claim is—

1. The horse-cover, composed of sections *d d*, when connected longitudinally by the cover *c* attached to rigid braces *e e*, substantially as and for the purposes described.

2. The horse-cover provided with elastic straps for holding the same to the horse, or together, substantially as described.

CHARLES P. EAGER.

Witnesses:

A. B. ELY,

W. M. PARKER.